United States Patent [19]
Tate et al.

[11] Patent Number: 5,983,149
[45] Date of Patent: *Nov. 9, 1999

[54] AUTOMATIC VEHICLE SPEED RETARDING CONTROL THROUGH ACTUATION OF WHEEL BRAKES

[75] Inventors: William J. Tate; Stephen R. Olson; Craig L. Koehrsen; Karl W. Kleimenhagen, all of Peoria, Ill.

[73] Assignee: Caterpillar Inc., Peoria, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/133,013

[22] PCT Filed: Apr. 8, 1991

[86] PCT No.: PCT/US91/02437

§ 371 Date: Apr. 8, 1991

§ 102(e) Date: Apr. 8, 1991

[87] PCT Pub. No.: WO88/01211

PCT Pub. Date: Feb. 25, 1988

[30] Foreign Application Priority Data

Apr. 8, 1991 [WO] WIPO ............ PCT/US91/02437

[51] Int. Cl.⁶ ..................................... B60K 31/04
[52] U.S. Cl. .................. 701/48; 477/71; 477/186; 701/78
[58] Field of Search ............ 364/424.05, 426.02, 364/426.04; 303/100; 180/171; 477/71, 186; 9/361; 701/36, 48, 78, 79, 93

[56] References Cited

U.S. PATENT DOCUMENTS

| | | | |
|---|---|---|---|
| 3,966,011 | 6/1976 | Minami et al. | 180/105 |
| 3,998,191 | 12/1976 | Beyerlein et al. | 123/102 |
| 4,462,479 | 7/1984 | Steel | 180/171 |
| 4,477,124 | 10/1984 | Watanabe | 303/100 |
| 4,485,444 | 11/1984 | Maruyama et al. | 364/426.04 |
| 4,577,718 | 3/1986 | Ueno | 180/179 |
| 4,618,040 | 10/1986 | Honma et al. | 477/71 |
| 4,774,667 | 9/1988 | Kuraoka et al. | 364/426.02 |
| 4,867,288 | 9/1989 | Simonyi et al. | 477/186 |
| 4,922,428 | 5/1990 | Takahashi | 364/426.04 |
| 4,932,311 | 6/1990 | Mibu et al. | 9/361 |
| 5,003,483 | 3/1991 | Hedström | 364/426.04 |

FOREIGN PATENT DOCUMENTS

| | | |
|---|---|---|
| 0145374 | 6/1985 | European Pat. Off. . |
| 0241872 | 10/1987 | European Pat. Off. . |
| 1553542 | 2/1968 | France . |
| 2140422 | 1/1973 | France . |
| 2308448 | 12/1975 | France . |
| 2506192 | 5/1982 | France . |
| 32 08 101 | 3/1982 | Germany . |

OTHER PUBLICATIONS

WO 88/01211; Feb. 25, 1988; International.

*Primary Examiner*—William A. Cuchlinski, Jr.
*Assistant Examiner*—Ed Pipala
*Attorney, Agent, or Firm*—R. Carl Wilbur; Kirk A. Vander Leest

[57] ABSTRACT

An apparatus (10) is provided for automatically actuating a brake system (28) in a work vehicle. The work vehicle has an engine (12) and a plurality of ground engaging wheels (24). At least one of the wheels (24) is driven by the engine (12) for propelling the vehicle. The brake system (28) is provided for opposing motion of at least one of the wheels. The apparatus (10) includes speed sensor (20) for sensing actual engine speed and responsively producing an actual engine speed signal. A controller (64) receives the actual engine speed signal and produces an error signal in response a difference between the actual and desired engine speed signals. The controller (64) further produce a control signal in response to the error signal. An actuator (76, 52, 58) is provided for receiving the control signal and controlling the braking force applied by the brake system (28) so as to reduce the error signal to zero.

9 Claims, 3 Drawing Sheets

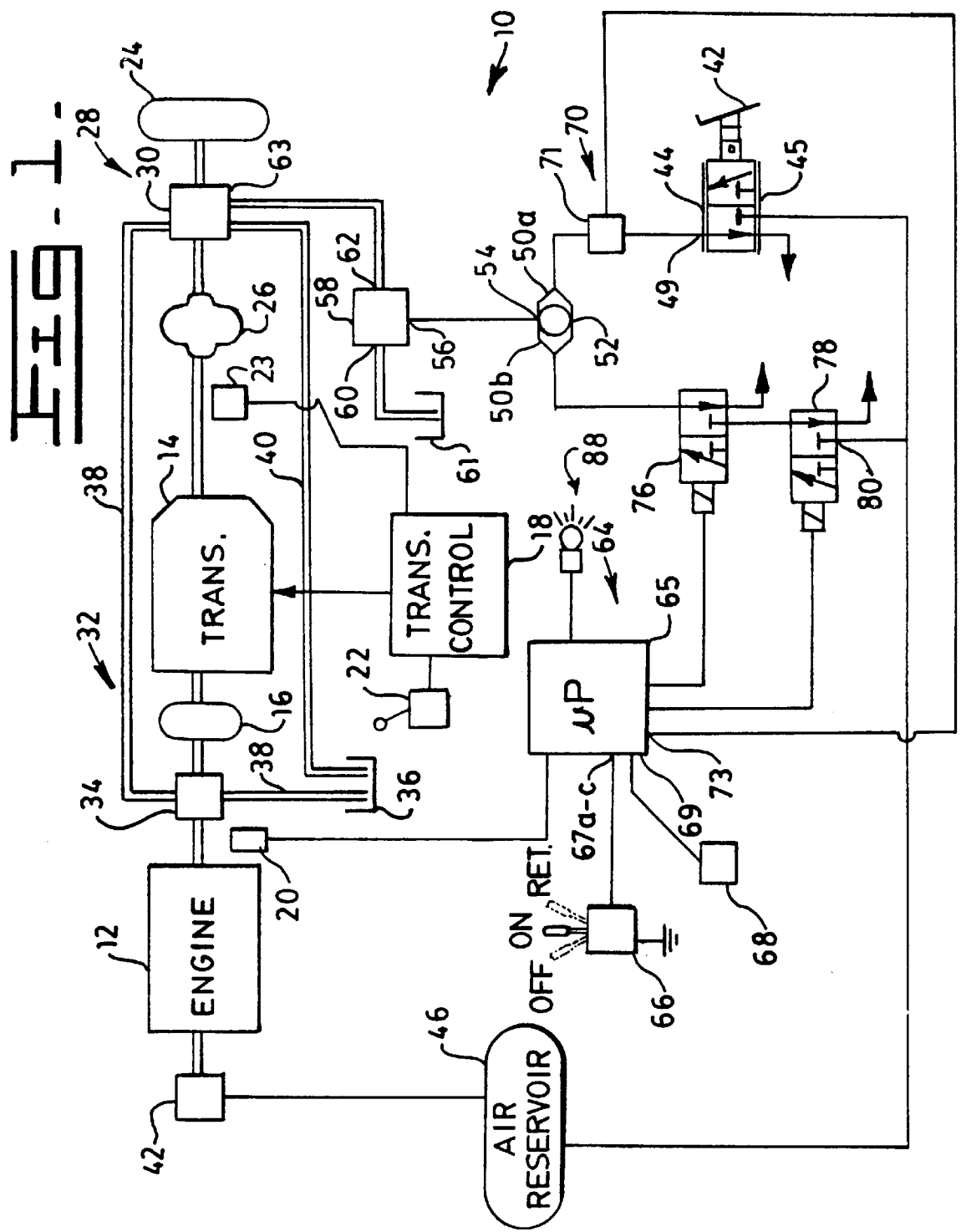

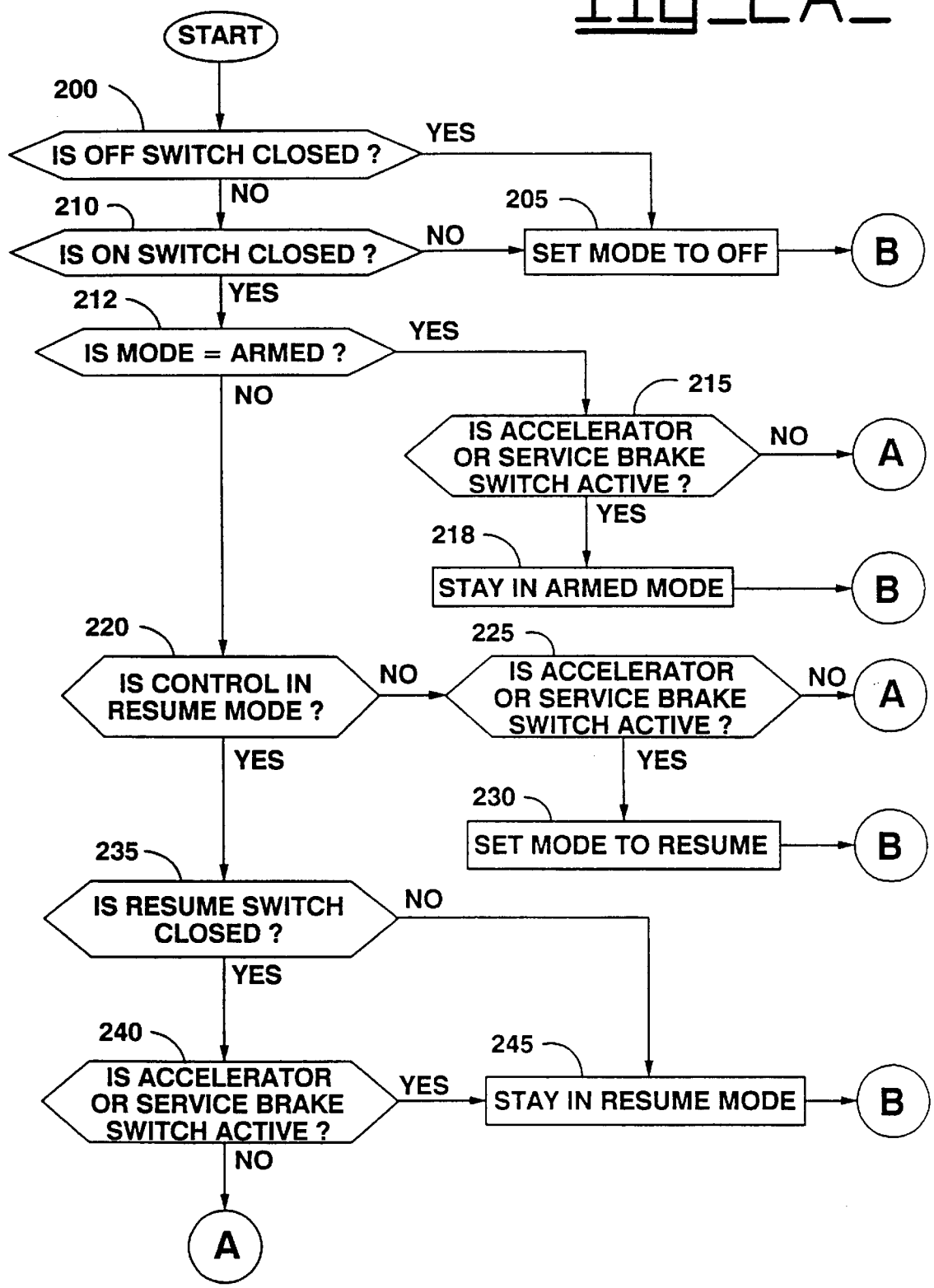
Fig_2A_

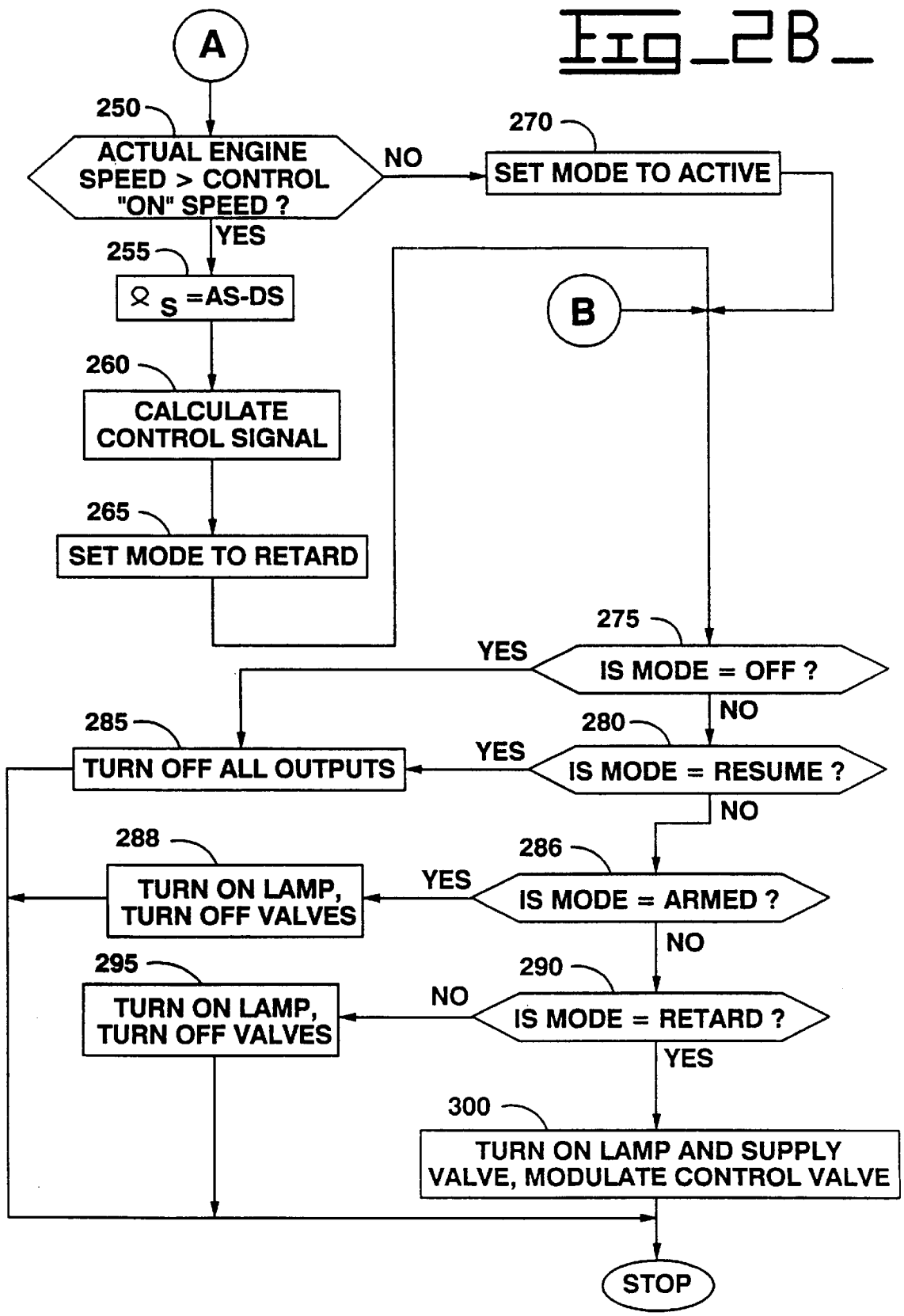

5,983,149

AUTOMATIC VEHICLE SPEED RETARDING CONTROL THROUGH ACTUATION OF WHEEL BRAKES

TECHNICAL FIELD

This invention relates generally to a vehicle speed control and, more particularly, to an electronic control for automatically actuating the brakes of a work vehicle so as to control vehicle speed.

BACKGROUND ART

Hydromechanical and friction retarder brakes have been employed extensively in the past for controlling vehicle speed on downhill grades. Past systems have typically relied exclusively on manual control by the operator. One such system is provided by the assignee herein on its off-highway dump trucks. These trucks are equipped with oil-cooled, pressure actuated disk brakes on all four sets of ground engaging wheels. The brakes are normally controlled by a manually operated brake pedal which is spring biased to a non-braking position in the absence of external force. A retarder control lever is provided to enable the operator to select a braking force for retarding purposes. The retarder lever remains at the position selected by the operator until it is forceably moved to a different position. The brake system is adapted to control the vehicle brakes to the greater of the two braking forces as requested by the brake pedal and the retarder control lever, thereby enabling the operator to override the retarder braking level with the brake pedal. Typically, the operator sets the retarder lever at the top of a hill. However, the braking level required to maintain a constant speed during descent of the hill depends on several factors including the slope of the hill and the vehicle load. The lever must be adjusted to maintain the desired speed during descent of the hill and, therefore, performing optimum brake control is difficult. It is possible for the operator to overheat the brakes on long descents. Hence, it is desirable to minimize operator control over the retarder brakes.

More automated brake systems have been developed to reduce the amount of operator input required to control the retarder brakes. Typically, these controls include a speed setting lever which enables the operator to select a desired ground speed. Actual ground speed is then sensed and used in a closed-loop control to regulate the brakes so as to control the vehicle speed to the desired speed. However, in such systems it is possible for the operator to overheat the brakes by selecting a high desired ground speed while operating the vehicle in a high gear. It is also possible to overspeed the engine if the operator selects a high ground speed and a low transmission gear.

In recognition of these problems, a more complex braking system has been proposed in U.S. Pat. No. 4,485,444 which issued on Nov. 27, 1984 to Maruyama et al., hereinafter referred to as Maruyama. Maruyama similarly operates on a closed loop ground speed control strategy. To prevent brake overheating, Maruyama is equipped with first temperature sensors for detecting the temperature of the cooling oil supplied to the vehicle's disc brakes. If the brakes become too hot, the controller overrides the desired speed, as set by the operator, and gradually reduces the desired ground speed in an attempt to prevent brake overheating. If the first temperature sensor were to fail or malfunction, it would be possible to overheat the brakes. In view of this, Maruyama provides a second temperature sensor for detecting faulty operation of the first temperature sensor. The system proposed by Maruyama adds unnecessary cost and complexity to the vehicle control system. Therefore, it is desirable to provide a less complex system in which temperature sensors are unnecessary and operator input is minimized.

The subject invention is directed to overcoming the above problems.

DISCLOSURE OF THE INVENTION

An apparatus is provided for automatically actuating a brake system in a work vehicle. The work vehicle has an engine and a plurality of ground engaging wheels. At least one of the wheels is driven by the engine for propelling the vehicle. The brake system is provided for opposing motion of at least one of the wheels. The apparatus includes a speed sensor for sensing actual engine speed and responsively producing an actual engine speed signal. A controller receives the actual engine speed signal and produces an error signal in response to a difference between the actual and desired engine speed signals. The controller further produces a control signal in response to the error signal. An actuator is provided for receiving the control signal and controlling the braking force applied by the brake system so as to reduce the error signal to zero.

In a second aspect of the present invention, an apparatus is provided for automatically controlling braking in a work vehicle. The work vehicle has an engine and a speed shiftable semi-automatic transmission of the type having a plurality of forward gears. A manually operable gear selector is provided for selecting a desired maximum transmission operating gear. A transmission controller effects shifting of the transmission in response to transmission output speed reaching predetermined shift points, and limits maximum transmission gear in response to the desired operating gear set by the gear selector. The vehicle has a plurality of ground engaging wheels, at least one of which is driven by the transmission for propelling the vehicle. A brake system is provided opposing motion of at least one of the wheels and thereby slowing the vehicle. The brake system includes a pressure actuated disk brake adapted to receive pressurized fluid and supply a braking force in proportion to the pressure of the fluid.

The apparatus includes a circuit for producing a desired engine speed signal which exceeds any of the transmission shift points. A speed sensor is provided for sensing actual engine speed and responsively producing an actual engine speed signal. A controller receives the desired and actual engine speed signals, produces an error signal in response a difference between the actual and desired engine speed signals, and produces a control signal in response to the error signal. An air pump provides a constant air pressure to a first valve. The first valve is adapted to receive the control signal and vary the air pressure applied to a master cylinder in response to the control signal. The master cylinder receives the pressurized air and delivers pressurized fluid to the disk brake in proportion to the received air pressure.

BRIEF DESCRIPTION OF THE DRAWINGS

FIG. 1 is a schematic drawing illustrating certain aspects of the immediate retarder brake control; and FIGS. 2A and 2B are software flowcharts which can be utilized in programming a microprocessor in accordance with certain aspects of the retarder brake control.

BEST MODE FOR CARRYING OUT THE INVENTION

Referring now to the drawings, and FIG. 1 in particular, a preferred embodiment of the subject automatic retarder brake control 10 will be described in detail. The retarder control 10 can readily be adapted for use in any vehicle having pressure actuated disc brakes. The retarder control 10 is currently being developed for use on series 785, 789 and 793 off-highway dump trucks as manufactured by Caterpillar Inc. of Peoria, Ill.

The vehicle (not shown) truck is equipped with an engine 12 which is preferably a series 3500 engine as manufactured by Caterpillar Inc. The engine 12 drives a speed shiftable semi-automatic transmission 14 through a torque converter 16. The transmission 14 has a plurality of forward and reverse gears. An electronic transmission controller 18 is provided for effecting shifting of the transmission 14 in response to sensed vehicle parameters, as is common in the art. The transmission controller 18 forms no part of the subject invention and, therefore, it will not be described in great detail. The transmission controller 18 preferably includes a microprocessor, such as a series 68HC11 as manufactured by Motorola, of Austin, Tex.

An engine speed sensor 20 is provided for sensing the speed of the engine and responsively producing an engine speed signal. Numerous sensors can be adapted to perform the function of the engine speed sensor 20. Preferably the sensor 20 is a magnetic pickup sensor adapted to sense rotation of a toothed wheel (not shown) which is driven in proportion to engine speed. The sensor 20 responsively produces a sinusoidal signal having a frequency proportional to engine speed.

The vehicle is also equipped with a gear selector lever 22 which enables the operator to select a maximum operating gear. A second speed sensor 23 is adapted to sense the output speed of the transmission and responsively produce a transmission output speed signal. The transmission controller 18 receives a transmission output speed signal and the maximum desired gear signal and effects operation of the transmission 14 in accordance with a predetermined shift strategy. In the above-mentioned Caterpillar vehicles, the transmission controller 18 is programmed to effect upshifts in each gear when the transmission output speed reaches a speed corresponding to an engine speed of 1840 RPM. The transmission controller 18 continues to effect upshifts each time the engine speed reaches 1840 RPM until the maximum desired gear, as indicated by the selector lever 22, is reached. If the transmission 14 is operating in the maximum desired gear and, for any reason, engine speed increases past a predetermined limit (e.g. 2350 RPM), the transmission controller 18 is programmed to shift the transmission 14 to one gear position above the desired gear, thereby preventing overspeeding of the engine 12.

The transmission 14 is adapted to drive the vehicle rear wheels 24 (one shown) through a final drive assembly 26. The vehicle is also provided with a brake system 28 for retarding motion of the vehicle. Preferably the brake system includes oil-cooled, pressure actuated disc brakes 30 on all vehicle wheels. The preferred brakes 30 are described in U.S. Pat. No. 3,941,219 which issued on Mar. 2, 1976 to Myers and is specifically incorporated by reference herein. On the driven wheels 24, the brakes 30 are disposed intermediate the wheels 24 and the drive assembly 26. If the vehicle has undriven wheels, such as the front wheels on the above-mentioned Caterpillar vehicles, these wheels are also preferably provided with brakes 30. The automatic retarder control 10 actuates the existing disc brakes 28 to maintain a constant ground speed. Specifically, the retarder control 10 maintains the vehicle at one of a plurality predetermined ground speeds, wherein the ground speed is controlled by the position of the selector lever 22.

The brake system 28 also includes a cooling system 32 to keep the brakes 30 from overheating. The cooling system 32 includes an engine driven pump 34 which circulates cooling fluid through the brakes 24 to reduce the temperature of the brakes 30. The pump 34 draws cooling fluid from a cooling fluid reservoir 36 and delivers it to the brakes 26 through a supply conduit 38. Cooling fluid is returned from the brakes 30 to the reservoir 36 through a return conduit 40. The pump 34 is directly driven by the engine; therefore, the volume of cooling fluid circulated through the brakes 30 is directly proportional to engine speed.

The brakes 30 can be manually operated using a brake pedal 42. The brake pedal 42 is spring biased to return to a neutral position in the absence of an external force. The brake pedal 42 mechanically actuates a regulator valve 44 for regulating air pressure from a pressurized air reservoir 46, i.e. an air tank. The air reservoir 46 is maintained at a constant pressure by an engine-driven air compressor 48. The regulator valve 44 has an input orifice 45 connected to the air reservoir 46 for receiving a constant air pressure from the reservoir 46. The regulator valve 44 has an output orifice 49 connected to a first input orifice 50a of a shuttle valve 52. The degree of brake pedal actuation proportionally controls the air pressure applied to the shuttle valve first input orifice 50a. The shuttle valve 52 further has a second input orifice 50b which receives pressurized air regulated by the subject retarder control 10, as explained below.

An output orifice 54 of the shuttle valve 52 is connected to an input orifice 56 of a master cylinder 58. The shuttle valve 52 delivers the higher of the two air pressures applied to its input orifices 50a, 50b to the master cylinder input orifice 56. The master cylinder 58 further has a fluid input orifice 60 which is adapted to draw hydraulic fluid from a fluid reservoir 61. An output orifice 62 of the master cylinder 54 is connected to an input orifice of the brake 36 by a fluid conduit 62. The master cylinder 54 is adapted to receive pressurized air from the shuttle valve 52 and deliver pressurized fluid to the disk brake 30 in proportion to the received air pressure.

The automatic retarder control 10 includes a controller 64 which may be implemented with any suitable hardware including analog or digital circuits which may be either discrete components or integrated. In the preferred embodiment, the controller 64 is implemented employing a microprocessor 65 with appropriate input and output signal conditioning circuits as is well known in the art. The microprocessor 65 is programmed to effect operation of the disk brakes 30 in response to sensed input parameters, as is explained below. Preferably the microprocessor 65 is a series 68HC11 microprocessor as manufactured by Motorola Semiconductor Products, Inc. of Austin, Tex.; however, numerous other commercially available devices could readily be adapted to perform the functions of the controller 64.

A three-position throw switch 66 is provided for selecting an operating mode of the retarder control 10. The throw switch 66 is movable between "off," "on," and "resume" positions, and is biased to the "on" position from the "resume" position in the absence of external force. The throw switch 64 is adapted to respectively connect "off," "on" and "resume" input terminals 67a–c to ground when the switch is in the "off," "on," and "resume" positions.

An accelerator pedal sensor 68 is provided for detecting when the accelerator pedal (not shown) is depressed and responsively producing an electrical signal. Preferably, the function of the accelerator pedal sensor 68 is performed using an absolute position sensor which produces a pulse-width-modulated signal corresponding to pedal position. Such a sensor is disclosed in U.S. Pat. No. 4,915,075 which issued on Apr. 10, 1990 to Brown. Currently, the accelerator pedal sensor 68 is embodied as a pressure actuated switch (not shown) which is disposed in the accelerator valve air line (not shown). The switch is normally closed when the accelerator pedal is not depressed, and the switch is biased open when the accelerator pedal is depressed. When the switch is closed, ground potential is applied to an input terminal 69 of the controller 64. Moreover, when the switch is biased open, a preselected electrical potential is applied to the controller input terminal 69.

A brake pedal sensor 70 is provided for sensing the position of the brake pedal and responsively producing an electrical signal. Again the sensor 70 preferably is in the form of an absolute position sensor, such as the one described in U.S. Pat. No. 4,915,075. However, the brake pedal currently embodied in a pressure actuated switch 71 disposed between the regulator valve 44 and the shuttle valve 52 for detecting when the brake pedal 42 is depressed. The switch 70 is normally closed, and is biased open, by air pressure, when the brake pedal is actuated. When the switch 71 is closed, ground potential is applied to an input terminal 73 of the controller 64. However, when the switch is biased open, a preselected electrical potential is applied to the controller input terminal 73.

The controller 64 is further connected to the engine speed sensor 20 for receiving the actual engine speed signal. A desired engine speed signal is also produced in response to the particular vehicle on which the retarder control 8 is implemented. The desired speed is selected to exceed any of the transmission upshift points and to be of a speed sufficient to ensure proper circulation of cooling fluid through the brakes 30. In the preferred embodiment the desired engine speed is set at 1950 RPM, which is 100 RPM above the normal transmission upshift speed. Therefore, the transmission 14 will be upshifted until the maximum desired gear is obtained.

The desired engine speed can be set permanently in memory. However, in the preferred embodiment, the controller 64 is adapted to receive a vehicle identification signal from a wiring harness (not shown), as is common in the art. The controller 65 produces one of a plurality desired end of speed signals in response to the vehicle identification signal. The controller 64 further produces an error signal $e_S$ in response to a difference between the actual and desired engine speed signals. The error signal is only calculated when the actual engine speed is above 1800 RPM. The controller 64 produces a control signal in response to the error signal and in accordance to the following formula:

$$\text{Control signal} = K_1 e_s + K_2 \Delta e_s + K_3 \Sigma e_s$$

where $K_1$, $K_2$, $K_3$ are emperically determined constants. As should be apparent, the control signal is limited to zero because a negative braking force would be meaningless. Using a proportional integral differential (PID) algorithm as shown above has the advantage of preventing engine overspeeding in instances when engine speed is increasing rapidly. Normally, the control signal will not be produced and thus the brakes will remain inactive, as long as actual engine speed is less than desired engine speed. However, if engine speed is rapidly increasing the PID algorithm anticipates the need for retarding and causes the brakes to become active before the desired engine speed is exceeded. If other strategies, such proportional or proportional integral controls were used, it could be possible to overspeed the engine in instances engine speed rapidly increases.

The control signal is in the form of a pulse-width-modulated signal having a constant frequency and a duty cycle responsive to the error signal $e_S$. The control signal is applied to a solenoid operated control valve 76 which is biased "opened" and "closed" in response to the duty cycle of the control signal.

A solenoid operated air supply valve 78 has an input orifice 80 connected to the air reservoir for receiving a constant air pressure. The supply valve 78 has an output orifice 82 connected to an input orifice 84 of the control valve 76. The controller 64 delivers a supply control signal to the supply valve 78 whenever the control signal is produced. When the supply control signal is produced, the supply valve 78 is biased open and a constant air pressure is applied to the control valve input orifice 84. The control valve 76 has an output orifice 86 connected to the second input orifice 50a of the shuttle valve 52. The air flow rate, and hence pressure, delivered to the shuttle valve second input orifice 50b is controlled by the duty cycle of the control signal applied to the control valve 78.

The retarder control has five modes: OFF, RETARD, ACTIVE, ARMED and RESUME. The control 10 is provided with a dash lamp 88 that is energized in certain modes for indicating the operating condition of the control 10. In the OFF mode, which is entered whenever the throw switch 66 is in the "off" position, the lamp 88 is deenergized and neither the control nor supply signals are produced. The ACTIVE mode is entered when the throw switch 66 is in the "on" position and actual engine speed is below 1800 RPM. The lamp is flashed at a preselected frequency during the ACTIVE mode to alert the operator that the RETARDER mode will be entered if engine speed exceeds 1800 RPM. The RETARD mode is entered when the throw switch 66 is in the "on" position and actual engine speed exceeds 1800 RPM. During the RETARD mode, the control and supply signals are produced as explained above. The RESUME mode is entered when the system is in the ACTIVE or RETARD modes and the operator steps on either the accelerator or brake pedals. If the throw switch 66 is moved to the "resume" position while the control is in the RESUME mode, the system will enter either the RETARD or ACTIVE mode depending on the actual engine speed. During the RESUME mode, the lamp 88 remains deenergized. The ARMED mode is entered whenever the control is in the RESUME mode and the throw switch is moved to the "resume" position while either of the brake or accelerator pedals is depressed. Control will remain in the ARMED mode until the brake and accelerator pedals are both released at which time control will enter either the ACTIVE or RETARD mode in dependance on engine speed. During the ARMED mode, neither the control nor supply signals are produced and the dash lamp 88 is energized at a preselected frequency.

Referring now to FIGS. 2A and 2B, an embodiment of software for programming the controller 64 in accordance with certain aspects of the immediate retarder control 10 is explained. FIGS. 2A and 2B are a flowchart illustrating a computer software program for implementing the preferred embodiment of the present invention. The program depicted in this flowchart is particularly well adapted for use with the microprocessor and associated components described above, although any suitable microprocessor may be utilized in practicing an embodiment of the present invention. This flowchart constitutes a complete and workable design of the preferred software program, and has been reduced to practice on the series 684HC11 microprocessor system. The software program may be readily coded from these detailed flowcharts using the instruction set associated with this system, or may be coded with the instructions of any other suitable conventional microprocessors. The process of writing software code from flowcharts such as these is a mere mechanical step for one skilled in the art.

Initially in the decision block 200 the switch 66 is sensed to determine the desired operating mode of the retarder control 10. If the switch 66 is in the "off" position, control is passed to the block 205 where a flag is set in memory indicating that the OFF mode is desired. Otherwise, control is passed to the block 210 where it is determined if the throw switch 66 is in the "on" position. If the switch is not in the "on" position, control is again passed to the block 205 where memory is set to indicate the OFF mode. The throw switch 66 is wired in such a way that the "on" input to the microprocessor is also active in when the switch is in the "resume" position. Therefore, the switch is presumed to have failed if neither the "off" nor the "on" positions are sensed at this stage.

If, in the block 210, it is determined that the throw switch 66 is in the "on" position, control is passed to the block 212 where memory is checked to determine if control is in the ARMED mode. If the ARMED mode is indicated, control is passed to the block 215 where the it is determined if either the brake or accelerator pedals are depressed as indicated by the brake pedal and accelerator pedal sensors 70, 68, respectively. If either pedal is depressed, control is passed to the block 218 causing control to stay in the ARMED mode. Subsequently, control is passed to the block 275. If, however, neither pedal is depressed, control is passed to the block 250. where memory is set to indicate the RESUME mode. In the block 250, either the RETARD mode or the ACTIVE mode is entered in dependance on engine speed.

If the ARMED mode is not detected in the block 212 control is passed to the block 220 where memory is checked to determine if the mode is currently set to RESUME. As set forth above, the RESUME mode is entered when the system is in the ACTIVE or RETARDING modes and the operator steps on either the accelerator pedal or the brake pedal. If memory does not indicate the RESUME mode, control is passed to the block 225 where it is determined if either the brake or accelerator pedals are depressed as indicated by the brake pedal and accelerator pedal sensors 70, 68, respectively. If either pedal is depressed, control is passed to the block 230 where memory is set to indicate the RESUME mode. However, if neither pedal is depressed, control is passed to the block 250.

If the RESUME mode is detected in the block 220, control is passed to the block 235 where it is determined if the throw switch 66 has been moved to the "resume" position since entering the RESUME mode. If it has not, the control remains in the RESUME mode. However, if the switch 66 has been moved to the "resume" position, control is passed to the block 240. In the block 240, the brake pedal and accelerator pedal sensors 70, 68 are checked to determine if either pedal is depressed. If either pedal is depressed, control remains in the RESUME mode.

However, if neither the brake pedal nor the accelerator pedal is depressed, control is passed to the block 250 where it is determined if actual engine speed exceeds the control "ON" speed of 1800 RPM. If it does, control is passed to the block 255 where an engine speed error $e_s$ is calculated in accordance with the following formula:

$$e_s = AS - DS$$

where $e_s$ represents the engine speed error, AS represents the actual engine speed as indicated by the speed sensor 20, and DS represents the desired engine speed.

Control is then passed to the block 260 where a control signal is calculated in response to the speed error and in accordance with the following formula:

$$\text{Control signal} = K_1 e_s + K_2 \Delta e_s + K_3 \Sigma e_s$$

where $K_1$, $K_2$ and $K_3$ are emperically determined constants. Subsequently, in the block 365, memory is set to indicate the RETARD mode.

If, however, in the block 250 it is determined that actual engine speed is below the desired engine speed, control is passed to the block 270 where memory is set to indicate the ACTIVE mode. If this occurs, the blocks 255 to 265 are skipped and no control signal is calculated.

In the blocks 275 to 280, memory is checked to determine if the mode is either OFF or RESUME. If either of these modes is indicated, control is passed to the block 285 where all driver outputs are turned off. More specifically, the control or supply signals are not produced in either the OFF or RESUME modes. If neither of these modes is indicated, control is passed to the block 286 where memory is checked to determine if the ARMED mode is indicated. If the ARMED mode is indicated, control is passed to the block 288 causing the lamp 88 to be energized at a preselected frequency and the control and supply signal drivers are turned off. If the ARMED mode is not indicated, control is passed to the block 290 where memory is checked to see if the mode is RETARD.

If the retard mode is not detected, the ACTIVE mode is assumed and control is passed to the block 295. In the block 295 the valve drivers are turned off and a retarder :Lamp is energized at the preselected frequency. If, however, the RETARD mode is indicated in the block 290, control is passed to the block 300, thereby causing the lamp 88 to be energized constantly and the control and supply signals to be delivered to the control and supply valves 76, 78, respectively.

INDUSTRIAL APPLICABILITY

Assume that the subject retarder control 10 is installed on an off-highway truck which is operating in a mine. When it is necessary to descend a hill, the operator activates the retarder control 10 by moving the throw switch 66 to the "on" position. The operator selects the speed at which he wished to descend the hill by positioning the gear selector in one of the forward gears. Each gear position will limit the vehicle to a different maximum speed, as set forth above. As long as the operator does not actuate either the brake or accelerator pedals, the retarder control 10 will be in either the ACTIVE or RETARD modes. The mode will be ACTIVE and the brakes 30 will be inactive as long as actual engine speed remains below the control "on" speed of 1800 RPM. However, if actual engine speed increases above 1800 RPM, the error and control signals will be calculated. Production of the control signal will be blocked as long as it remains negative. Typically, this will be true whenever actual engine speed is below the desired engine speed of 1950 RPM. However, if engine speed is rapidly increasing, the control signal may become positive before the desired engine speed is reached. When the control signal becomes positive, the control and supply signals will be delivered to the to control and supply valves. The duty cycle of the control signal is responsive to the speed error such that more braking pressure is applied as the error signal increases. If the operator steps on either the brake or accelerator pedals, while the throw switch 66 is in the "on" position, the RESUME mode will be activated. Control will return one of the ACTIVE or RETARD modes if the operator moves the throw switch 66 to the "resume" position while the RESUME mode is active. If however, the operator moves the switch 66 to "resume" while either the brake or accelerator pedals are depressed, control will enter the ARMED mode. Control will remain in the ARMED mode until both pedals are released at which time one of the ACTIVE or RESUME modes will be entered. Other aspects, objects, and advantages of this invention can be obtained from a study of the drawings, the disclosure, and the appended claims.

We claim:

1. In a work vehicle having an electronically readable vehicle identification number, an engine (12), a plurality of ground engaging wheels (24) at least one of which is driven by the engine (12) for propelling the vehicle, and a brake system (28) for opposing motion of at least one of the wheels (24), an apparatus (10) for automatically actuating the brake system, comprising:

means (64) for producing a desired engine speed signal wherein said desired engine speed signal is a function of said vehicle identification number;

speed sensing means (20) for sensing actual engine speed and responsively producing an actual engine speed signal;

a controller (64) for receiving the desired and actual engine speed signals, producing an error signal in response to a difference between the actual and desired engine speed signals, and producing a control signal in response to a value of the error signal; and actuator means (58, 76) for receiving the control signal and controlling the braking force applied by the brake system (28) so as to reduce the error signal to zero, wherein said braking force is a function of the value of the control signal.

2. The apparatus (10) as set forth in claim 1 wherein the brake system (24) includes:

a pressure actuated disk brake (30) adapted to receive pressurized fluid and supply a braking force in proportion to the pressure of the received fluid; and wherein the actuator means includes an air supply means (46, 76) for producing pressurized air at a pressure responsive to the control signal and a master cylinder (58) adapted to receive the pressurized air and deliver pressurized fluid to the disk brake (30) in proportion to the received air pressure.

3. The apparatus (10) as set forth in claim 2 wherein the air supply means includes:

first means (46) for producing pressurized air; and a control first valve (76) being adapted to receive the control signal and the pressurized air, and to vary the air pressure supplied to the master cylinder (58) in response to the control signal.

4. The apparatus as set forth in claim 3 wherein the control signal is of a constant frequency and a variable duty cycle, and wherein the duty cycle is varied in proportion to the error signal.

5. In a work vehicle having an electronically readable vehicle identification number, an engine (12), a speed shiftable semi-automatic transmission of the type having a plurality of forward gears, a manually operable gear selector means (22) for selecting a desired maximum operating gear, a transmission controller (18) for effecting shifting of the transmission (14) in response to engine speed reaching predetermined shift points and limiting the maximum transmission gear in response to the desired maximum operating gear, a plurality of ground engaging wheels (24) at least one of which is driven by the transmission (14) for propelling the vehicle, and a brake system (28) for opposing motion of at least one of the wheels (24), the brake system (28) including a pressure actuated disk brake (30) adapted to receive pressurized fluid and supply a braking force in proportion to the pressure of the fluid, an apparatus (10) for automatically actuating the brake system (28), comprising:

means (64) for producing a desired engine speed signal, wherein said desired engine speed signal is a function of said vehicle identification number and exceeds any of the transmission shift points;

speed sensing means (20) for sensing actual engine speed and responsively producing an actual engine speed signal;

controller (64) for receiving the desired and actual engine speed signals, producing an error signal in response to a difference between the actual and desired engine speed signals, and producing a control signal in response to the error signal; and first means (46) for producing pressurized air of an essential constant pressure;

a control valve (76) being adapted to receive the control signal and the pressurized air from the first means and produce pressurized air at a pressure responsive to the control signal; and a master cylinder (58) adapted to receive the pressurized air and deliver pressurized fluid to the disk brake in proportion to the received air pressure.

6. The apparatus (10) set forth in claim 5 wherein the control signal is of a constant frequency and a variable duty cycle and wherein the duty cycle is varied in proportion to the error signal.

7. A method for automatically actuating a brake system (28) in a work vehicle having an electronically readable vehicle identification number, an engine (12), a plurality of ground engaging wheels (24) at least one of which is driven by the engine (12) for propelling the vehicle, and a brake system (28) for opposing motion of at least one of the wheels (24), the method comprising the steps of:

producing a desired engine speed signal, wherein said desired engine speed signal is a function of said vehicle identification number;

sensing actual engine speed and responsively producing an actual engine speed signal;

producing an error signal in response to a difference between the actual and desired engine speed signals;

producing a control signal in response to the error signal; and controlling the braking force applied by the brake system (28) so as to reduce the error signal to zero.

8. The method set forth in claim 7 wherein the control signal is of a constant frequency and a variable duty cycle and wherein the duty cycle is varied in proportion to the error signal.

9. A method for controlling the brakes of a work vehicle, having an electronically readable vehicle identification number, an engine (12), a speed shiftable semi-automatic transmission (14) of the type having a plurality of forward gears, a manually operable gear selector means (22) for selecting a desired maximum operating gear, a transmission controller (18) for effecting shifting of the transmission (14) in response to engine speed reaching predetermined shift points and for limiting the maximum transmission gear in response to the desired maximum operating gear, a plurality of ground engaging wheels (24) at least one of which is driven by the transmission (14) for propelling the vehicle, and a brake system (28) for opposing motion of at least one of the wheels (28), the brake system (28) including a pressure actuated disk brake (30) adapted to receive pressurized fluid and supply a braking force in proportion to the pressure of the fluid, comprising the steps of:

producing a desired engine speed signal which exceeds any of the transmission shift points, wherein said desired engine speed signal is a function of said vehicle identification number;

sensing actual engine speed and responsively producing an actual engine speed signal;

producing an error signal in response to a difference between the actual and desired engine speed signals;

producing a control signal having a constant frequency and a duty cycle responsive to the error signal;

delivering pressurized fluid to the pressure actuated disk brakes (30) at a pressure responsive to the duty cycle of the control signal.

* * * * *